| United States Patent [19] | [11] Patent Number: 4,683,255 |
| Sugio et al. | [45] Date of Patent: Jul. 28, 1987 |

[54] POLYPHENYLENE ETHER RESIN COMPOSITION HAVING EXCELLENT FIRE RETARDANCY

[75] Inventors: Akitoshi Sugio; Masao Okabe; Akikazu Amagai, all of Tokyo, Japan

[73] Assignee: Mitsubishi Gas Chemical Company, Inc., Tokyo, Japan

[21] Appl. No.: 832,756

[22] Filed: Feb. 25, 1986

[30] Foreign Application Priority Data

Feb. 27, 1985 [JP] Japan .................................. 60-37846
Feb. 28, 1985 [JP] Japan .................................. 60-39983

[51] Int. Cl.⁴ ............................ C08K 5/51; C08K 5/52
[52] U.S. Cl. .................................... 524/151; 524/141; 525/905
[58] Field of Search ................................ 524/141, 151

[56] References Cited

U.S. PATENT DOCUMENTS 4,224,209  9/1980  Cooper et al. ...................... 524/141
4,373,045  2/1983  Cooper et al. ...................... 524/141
4,556,685  12/1985  Sugio et al. ......................... 524/141

*Primary Examiner*—Jacob Ziegler
*Attorney, Agent, or Firm*—Wenderoth, Lind & Ponack

[57] ABSTRACT

A polyphenylene ether resin composition having excellent fire retardancy comprising (A) a polyphenylene ether resin, and
(B) at least one phosphate compound selected from the group consisting of biphenyl phosphate compounds and naphthyl phosphate compounds.

6 Claims, No Drawings

POLYPHENYLENE ETHER RESIN COMPOSITION HAVING EXCELLENT FIRE RETARDANCY

This invention relates to a polyphenylene ether resin composition having excellent fire retardancy, and more specifically, to a polyphenylene ether resin composition containing a fire retardant whose volatilization is substantially prevented, and retaining excellent heat resistance and mechanical resistance.

Polyphenylene ether is a resin having superior heat resistance, rigidity and electrical properties and is in widespread use as engineering plastics. However, the polyphenylene ether has inferior moldability and impact strength and moreover its fire retardancy is by no means satisfactory.

In an attempt to improve the moldability or impact strength of polyphenylene ether polymers, techniques of blending them with styrene-type resins, elastomer-reinforced styrene-type resins or various elastomers have been disclosed in various publications including U.S. Pat. No. 3,383,435. It is well known however that the incorporation of styrene-type resins or elastomers greatly reduces the fire retardancy of polyphenylene ethers.

Accordingly, it is known that to use a polyphenylene ether resin, or a resin composition comprising a polyphenylene ether, a styrene-type resin and/or an elastomer for applications requiring fire retardancy, it is essential to incorporate a fire retardant. Fire retardants which have heretofore been found to be effective are mainly phosphorus-containing compounds and halogen-containing compounds. For example, Japanese Laid-Open Patent Publications Nos. 32947/1974, 73248/1978, 16081/1980 and 30737/1982 propose the use of aromatic phosphates of a monocyclic phenol compound.

The aromatic phosphates, when blended with polyphenylene ethers as fire retardants, exhibit an excellent fire retarding effect and also improve the moldability of the polyphenylene ethers because of their plasticizing effect. On the other hand, these phosphate fire retardants inevitably reduce the heat resistance, shown, for example, by heat distortion temperature, and the mechanical strength properties, shown, for example, by tensile strength, of the polyphenylene ethers. Another problem, which is cumbersome, is that the phosphate fire retardant volatilizes from the surface of a molded article during molding to cause contamination of the mold and consequently impair the appearance of the molded article. This is attributed to the fact that the molding temperature for a molding material containing a polyphenylene ether resin is as high as 250° to 300° C., and constitutes a serious problem in practical applications. For example, triphenyl phosphate or tricresyl phosphate, when kneaded with the resin component and heated to about 300° C., will be volatilized even to an extent of about 20%.

As a technique for solving the problem of the volatility of the phosphates, Japanese Laid-Open Patent Publication No. 118957/1980 proposes the use of an aromatic phophoric acid ester polymer. The use of this polymer provides a solution to the problem of volatility, but, on the other hand, does not improve the melt flowability of the polyphenylene ether and impairs its moldability, presumably because of the structure of the polymer.

On the other hand, many known techniques exist with regard to halogen-containing compounds. For example, Japanese Laid-Open Patent Publication No. 7945/1973 proposes the incorporation of hexabromobenzene and antimony oxide. Japanese Patent Publication No. 39014/1973 and Japanese Laid-Open Patent Publication No. 57255/1977 disclose the addition of similar aromatic halogen compounds. The halogen-containing compounds hardly have a plasticizing effect on polyphenylene ethers, and when incorporated in the polyphenylene ethers, hardly reduce their heat resistance. This is the excellent characteristic not observed with the phosphate esters. But the halogen-containing compounds still have the defect of being unable to improve the moldability of the polyphenylene ethers. It is moreover well known that when the halogen-containing compounds are used as fire retardants, blooming occurs owing to the migration of the halogen-containing compounds to the surface of the molded article, and the thermal decomposition products of the halogen-containing compounds corrode the molding machine or molds.

Japanese Patent Publication No. 38768/1973 discloses the use of a combination of a phosphate ester and an aromatic halogen compound. In this method, the essential defects caused by the use of the phosphate ester and the halogen-containing compound still remain.

It is an object of this invention to provide a polyphenylene ether resin composition having excellent fire retardancy.

Another object of this invention is to provide a polyphenylene ether resin composition containing a fire retardant whose volatilization is inhibited, and having good moldability, excellent heat resistance and excellent mechanical strength.

Other objects of this invention along with its advantages will become apparent from the following description.

According to this invention, these objects and advantages are achieved by a polyphenylene ether resin composition having excellent fire retardancy comprising
(A) a polyphenylene ether resin, and
(B) at least one phosphate compound selected from the group consisting of biphenylyl phosphate compounds represented by the following formula

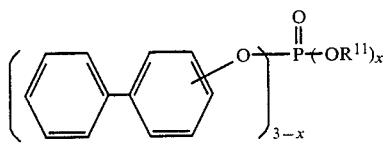

wherein x is 0, 1 or 2, and $R^{11}$ represents a linear or branched alkyl group having 1 to 8 carbon atoms or a phenyl group, provided that the biphenyl group and phenyl group may each be substituted by an alkyl group having 1 to 3 carbon atoms, and naphthyl phosphate compounds represented by the following formula

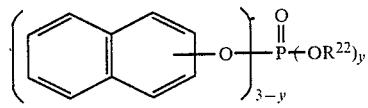

wherein y is 0, 1 or 2, and $R^{22}$ represents a linear or branched alkyl group having 1 to 8 carbon atoms or a phenyl group, provided that the naphthyl group and phenyl group may each be substituted by an alkyl group having 1 to 3 carbon atoms.

The polyphenylene ether resin (A) constituting the resin composition of this invention denotes a homo- or co-polymer of phenylene ether, and a grafted polyphenylene ether polymer obtained by grafting an aromatic vinyl compound to such a homo- or co-polymer.

Preferably, the homopolymer or copolymer of polyphenylene ether is obtained by polycondensing a monocyclic phenol represented by the following formula

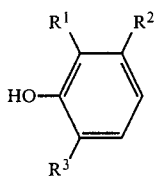

(I)

wherein $R^1$ represents a lower alkyl group having 1 to 3 carbon atoms, and $R^2$ and $R^3$, independently from each other, represent a hydrogen atom or an alkyl group having 1 to 3 carbon atoms.

The homopolymer can be obtained from a single monocyclic phenol, and the copolymer, from two or more monocyclic phenols.

The alkyl group having 1 to 3 carbon atoms in general formula (I) denotes methyl, ethyl, n-propyl and iso-propyl groups.

Examples of the monocyclic phenol of general formula (I) include 2,6-dimethylphenol, 2,6-diethylphenol, 2,6-dipropylphenol, 2-methyl-6-ethylphenol, 2-methyl-6-propylphenol, 2-ethyl-6-propylphenol, o-cresol, 2,3-dimethylphenol, 2,3-diethylphenol, 2,3-dipropylphenol, 2-methyl-3-ethylphenol, 2-methyl-3-propylphenol, 2-ethyl-3-methylphenol, 2-ethyl-3-propylphenol, 2-propyl-3-methylphenol, 2-propyl-3-ethylphenol, 2,3,6-trimethylphenol, 2,3,6-triethylphenol, 2,3,6-tripropylphenol, 2,6-dimethyl-3-ethylphenol and 2,6-dimethyl-3-propylphenol. Accordingly, examples of polyphenylene ether resins obtained by polycondensing these monocyclic phenols include homopolymers such as poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether and poly(2-ethyl-6-propyl-1,4-phenylene)ether, and copolymers such as 2,6-dimethylphenol/2,3,6-trimethylphenol copolymer, 2,6-dimethylphenol/2,3,6-triethylphenol copolymer, 2,6-diethylphenol/2,3,6-trimethylphenol copolymer and 2,6-dipropylphenol/2,3,6-trimethylphenol copolymer.

Of these, poly(2,6-dimethyl-1,4-phenylene)ether and 2,6-dimethylphenol/2,3,6-trimethylphenol copolymer are preferred.

Preferred as the aforesaid grafted polymer is a graft polymer obtained by grafting an aromatic vinyl compound represented by the following formula (II)

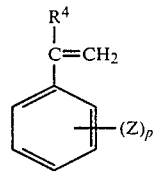

(II)

wherein $R^4$ represents a hydrogen atom or a lower alkyl group, Z represents a halogen atom or a lower alkyl group, and p is 0 or an integer of 1 to 3, to the polyphenylene ether homo- or co-polymer. The grafted polymer can be produced, for example, by the method described in Japanese Laid-Open Patent Publication No. 126,800/1975. Examples of the aromatic vinyl compound are styrene, alpha-methylstyrene, vinyltoluene, vinylxylene, ethyl styrene, n-propylstyrene, iso-propylstyrene, chlorostyrene and bromostyrene.

Especially preferred grafted polymers are a graft polymer obtained by grafting styrene to poly(2,6-dimethyl-1,4-phenylene)ether and a graft polymer obtained by grafting styrene to 2,6-dimethylphenol/2,3,6-trimethylphenol copolymer.

The composition of this invention may further contain a polystyrene resin (C) in addition to the polyphenylene ether resin (A).

The polystyrene resin (C) is preferably one containing at least 25% by weight of structural units of the following formula (III)

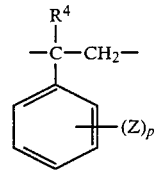

(III)

wherein $R^4$, Z and p are as defined with regard to formula (II).

The lower alkyl group for $R^4$ and Z in formula (III) is preferably an alkyl group having 1 to 3 carbon atoms, such as methyl, ethyl, n-propyl and iso-propyl.

The halogen atom for Z in formula (III) is preferably chlorine or bromine.

The structural units of formula (III) are derived from a styrene monomer of the above formula (II).

Examples of preferred polystyrene resins are polystyrene, polychlorostyrene, rubber-modified polystyrene, poly(p-methylstyrene), rubber-modified poly(p-methylstyrene), styrene/butadiene copolymer, styrene/butadiene/acrylonitrile copolymer, styrene/acrylic acid rubber/acrylonitrile copolymer, styrene/alpha-methylstyrene copolymer, styrene/butadiene resinous block copolymer, styrene/maleic anhydride copolymer and rubber-modified styrene/maleic anhydride copolymer.

Among these, high-impact polystyrene is especially preferred. The rubber-modified polystyrene may be obtained by modifying polystyrene with elastomers such as polybutadiene, butadiene-styrene copolymer rubber or EPDM. The rubber-modified polystyrene denotes a resin having an elastomer phase in the form of particles dispersed in a matrix of polystyrene. Such a resin can be formed by mechanically mixing polystyrene with an elastomer, or by copolymerizing an elastomer with a styrene-type monomer. Resins obtained by the latter method are preferably used in this invention. Industrially, the rubber-modified polystyrene resin is produced by graft polymerizing a styrene-type monomer in the presence of an elastomer.

The polystyrene resin (C) may be one of the above-exemplified, resins, or a mixture of two or more of them.

The phosphate compounds used in the resin composition of this invention are biphenylyl phosphates and naphthyl phosphates.

The biphenylyl phosphates are represented by the following formula (B1)

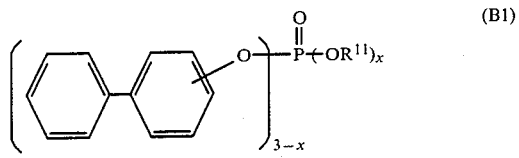

wherein x is 0, 1 or 2, and $R^{11}$ represents a linear or branched alkyl group having 1 to 8 carbon atoms or a phenyl group, provided that the biphenyl group and phenyl group may each be substituted by an alkyl group having 1 to 3 carbon atoms.

In formula (B1), x is 0, 1 or 2. $R^{11}$ represents a linear or branched alkyl group having 1 to 8 carbon atoms or a phenyl group. Examples of the alkyl group having 1 to 8 carbon atoms are methyl, ethyl, n-propyl, iso-propyl, n-butyl, iso-butyl, sec-butyl, t-butyl, n-pentyl, n-hexyl, n-heptyl and n-octyl.

The biphenyl group and phenyl group present in formula (B1) may each be substituted by an alkyl group having 1 to 3 carbon atoms such as methyl, ethyl, n-propyl or iso-propyl.

The biphenyl phosphate compounds of formula (B1) have at least one biphenyl structure, and according to the value of x, can be mono-, bis- or tris-biphenylyl phosphate compounds.

Examples of the monobiphenylyl phosphate compound corresponding to general formula (B1) in which x is 2 include 2- or 4-biphenylyl diphenylphosphate,
2- or 4-biphenylyl dicresylphosphate,
2- or 4-biphenylyl dixylenylphosphate,
2- or 4-biphenylyl dinaphthylphosphate,
2- or 4-biphenylyl dimethylphosphate,
2- or 4-biphenylyl diethylphosphate,
2- or 4-biphenylyl dipropylphosphate,
2- or 4-biphenylyl dibutylphosphate, and
2- or 4-biphenylyl dioctylphosphate.

Examples of the bisbiphenylyl phosphate compound corresponding to general formula (B1) in which x is 1 include bis(2- or 4-biphenylyl) phenylphosphate,
bis(2- or 4-biphenylyl) cresylphosphate,
bis(2- or 4-biphenylyl) xylenylphosphate,
bis(2- or 4-biphenylyl) naphthylphosphate,
bis(2- or 4-biphenylyl) methylphosphate,
bis(2- or 4-biphenylyl) ethylphosphate,
bis(2- or 4-biphenyly) propylphosphate,
bis(2- or 4-biphenylyl) butylphosphate, and
bis(2- or 4-biphenylyl) octylphosphate.

An example of the trisbiphenylyl phosphate compound corresponding to general formula (B1) in which x is 0 is tris(2- or 4-biphenylyl) phosphate.

As stated hereinabove, one or both of the two benzene rings of the biphenylyl group in these biphenylyl phosphates may be substituted by an alkyl group having 1 to 3 carbon atoms.

Among the aforesaid biphenylyl phosphate compounds, those of general formula (B1) in which x is 1 or 2, particularly 2, are preferred. Mono- or bis-biphenylyl phosphates of general formula (B1) in which $R^{11}$ is a phenyl group or an alkyl-substituted phenyl group are more suitably used for achieving the objects of this invention. More preferably, these preferred compounds have a 4-biphenylyl groups as the biphenylyl phosphate group.

The biphenylyl phosphate compounds are produced, for example, by reacting a phenylphenol compound or a mixture of it with an optional component such as a phenol compound or an aliphatic alcohol compound, with phosphorus oxychloride. The method of production is disclosed, for example, in U.S. Pat. Nos. 2,033,918 and 2,117,291. When the above mixture is used as a starting material, the proportion of the mono-, bis- or tris-biphenylyl phosphate compound can be varied by properly changing the mixing proportins or the sequence of reaction of the materials. When it is desired to obtain the mono- bis- or tris-biphenylyl phosphate compound singly, the desired biphenylyl phosphate compound may be isolated from the reaction product by a known separating procedure such as distillation. On the other hand, when two or more biphenylyl phosphate compounds of general formula (B1) are to be used in preparing the composition of this invention, the mixed product comprising the mono-, bis- and tris-biphenylyl phosphate compounds obtained by the reaction may be used as such. Where there is no need to adjust the mixing ratio of the mono-, bis- and tris-biphenylyl phosphate compounds strictly, the use of the mixed product as such is practical and advantageous. Generally, in the case of using a mixture of two or more biphenylyl phosphate compounds of general formula (B1) in the resin composition of this invention, the proportion of the monobiphenylyl phosphate compound used is desirably at least 50% by weight. Preferably, such a mixture is substantially free from the tris-biphenylyl phosphate. Especially preferably, the biphenylyl group in such phosphates is a 4-biphenylyl group.

The naphthyl phosphate compounds used in this invention are represented by the following formula (B2)

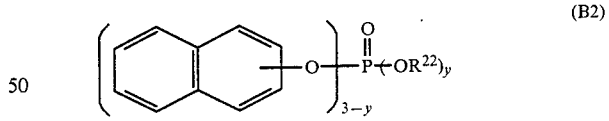

wherein y is 0, 1 or 2, and $R^{22}$ represents a linear or branched alkyl group having 1 to 8 carbon atoms or a phenyl group, provided that the naphthyl group and phenyl group may each be substituted by an alkyl group having 1 to 3 carbon atoms.

In formula (B2), y is 0, 1 or 2. $R^{22}$ is a linear or branched alkyl group having 1 to 8 carbon atoms, or a phenyl group. The naphthyl group or phenyl group present in formula (B2) may each be substituted by an alkyl group having 1 to 3 carbon atoms. Examples of the alkyl group may be the same as those given with regard to formula (B1).

The naphthyl phosphate compounds of formula (B2) have at least one naphthyl group and can be mono-, bis- or tris-naphthyl phosphate compounds according to the value of y.

Examples of the mononaphthyl phosphate compounds corresponding to general formula (B2) in which y is 2 include
1- or 2-naphthyl diphenylphosphate,
1- or 2-naphthyl dicresylphosphate,
1- or 2-naphthyl dixylenylphosphate,
1- or 2-naphthyl dimethylphosphate,
1- or 2-naphthyl diethylphosphate,
1- or 2-naphthyl dipropylphosphate,
1- or 2-naphthyl dibutylphosphate, or
1- or 2-naphthyl dioctylphosphate.

Examples of the bisnaphthyl phosphate compounds corresponding to general formula (B2) in which y is 1 include
bis(1- or 2-naphthyl)phenylphosphate,
bis(1- or 2-naphthyl)cresylphosphate,
bis(1- or 2-naphthyl)xylenylphosphate,
bis(1- or 2-naphthyl)methylphosphate,
bis(1- or 2-naphthyl)ethylphosphate,
bis(1- or 2-naphthyl)propylphosphate,
bis(1- or 2-naphthyl)butylphosphate, and
bis(1- or 2-naphthyl)octylphosphate.

Tris(1- or 2-naphthyl)phosphate is an example of the tris-naphthyl phosphate compounds according to general formula (B2) in which y is 0.

As stated hereinabove, one or both of the two naphthyl rings in the naphthyl phosphate compounds may be substituted by an alkyl group having 1 to 3 carbon atoms.

Preferred naphthyl phosphate compounds are those of general formula (B2) in which y is 1 or 2, particularly 2. More preferred are mono- or bis-naphthyl compounds of formula (B2) in which $R^{22}$ is a phenyl group or an alkyl-substituted phenyl group.

The naphthyl phosphate compounds are produced usually by reacting a naphthol compound alone or a mixture of it with an optional component such as a phenol compound or an aliphatic alcohol component, with phosphorus oxychloride. The method of production is disclosed, for example, in U.S. Pat. No. 3,356,471 and West German Pat. No. 367,954. When the above mixture is used as a starting material, the proportion of the mono-, bis- or tris-naphthyl phosphate compound can be varied by properly changing the mixing proportions or the sequence of reaction of the materials. When it is desired to obtain the mono- bis- or tris-naphthyl phosphate compound singly, the desired naphthyl phosphate compound may be isolated from the reaction product by a known separating procedure such as distillation. On the other hand, when two or more naphthyl phosphate compounds of general formula (B2) are to be used in preparing the composition of this invention, the mixed product comprising the mono-, bis- and tris-naphthyl phosphate compounds obtained by the reaction may be used as such. Where there is no need to adjust the mixing ratio of the mono-, bis- and tris-naphthyl phosphate compounds strictly, the use of the mixed product as such is practical and advantageous. Generally, in the case of using a mixture of two or more naphthyl phosphate compounds of general formula (B2) in the resin composition of this invention, the proportion of the mononaphthyl phosphate compound used is desirably at least 50% by weight. Preferably, such a mixture is substantially free from the tris-naphthyl phosphate.

In the present invention, the biphenylyl phosphate compound of formula (B1) is preferred to the naphthyl phosphate compound of formula (B2). When the two compounds are to be used in combination, it is desirable to use the biphenylyl phosphate compound in a proportion of at least 50% by weight.

The resin composition of this invention may further comprise a triaryl or trialkyl phosphate compound represented by the following formula (IV)

$$O{=}P{\left(OR^5\right)}_3 \qquad (IV)$$

wherein $R^5$ represents a linear or branched alkyl group having 1 to 8 carbon atoms or a phenyl group, in which each phenyl group may be substituted by an alkyl group having 1 to 3 carbon atoms, in an amount which does not reduce the effect of this invention.

A triaryl or trialkyl phosphate compound formed as a by-product in the reaction of a mixture of a phenyl phenol compound or a naphthol compound and a phenol compound or an aliphatic alcohol compound with phosphorus oxychloride may be used as a mixed product with a biphenylyl or naphthyl phosphate compound. If desired, a separately prepared triaryl or trialkyl phosphate compound may be added to the biphenylyl or naphthyl phosphate compound.

In the resin composition of this invention, the proportion of the phosphate compound of formula (B1) and/or formula (B2) is preferably 1 to 50% by weight, more preferably 1 to 25% by weight, the remainder being the polyphenylene ether resin or a mixture of it with a polystyrene resin. When the polyphenylene ether resin and the polystyrene resin are used in combination, the polyphenylene ether is included in an amount of preferably 1 to 99% by weight, more preferably 10 to 90% by weight, especially preferably 20 to 80% by weight, based on total weight of the resin components.

An elastomer component may also be incorporated in the resin composition of this invention in addition to the aforesaid resin components. The elastomer, as used herein, is an elastomer in an ordinary sense of the word. For example, the definition used at pages 71 to 78 of A. V. Tobolsky, "Properties and Structures of Polymers" (John Wiley & Sons, Inc., 1960) can be cited, and the elastomer means a polymer having a Young's modulus at ordinary temperature of $10^5$ to $10^9$ dynes/cm$^2$ (0.1 to 1020 kg/cm$^2$). Specific examples of the elastomer include an A-B-A' type elastomeric block copolymer, a A-B'-A' type elastomeric block copolymer in which the double bond of the polybutadiene portion is hydrogenated, polybutadiene, polyisoprene, a copolymer of a diene compound and a vinyl aromatic compound, a radial tereblock copolymer, nitrile rubber, and ethylene/propylene copolymer, an ethylene/propylene/diene copolymer (EPDM), thiokol rubber, polysulfide rubber, acrylic rubber, polyurethane rubber, a grafted polymer of butyl rubber and polyethylene, a polyester elastomer and polyamide elastomer. Among these elastomers, the A-B-A' type elastomeric block copolymer and A-B'-A' type elastomeric block copolymer are preferred. The terminal blocks A and A' of these block copolymers are blocks of polymerized vinyl aromatic hydrocarbons, and B or B' is a block of a polymerized conjugated diene or a block of a conjugated diene in which most of the double bonds are hydrogenated. Desirably, the molecular weight of the block B is larger than the total molecular weight of the blocks A and A'. The terminal blocks A and A' may be identical or different. These blocks are a thermoplastic homopolymer or copolymer derived from a vinyl aromatic compound whose aromatic moiety is monocyclic or polycyclic. Examples of such a vinyl aromatic compound are styrene, alpha-methylstyrene, vinyltoluene, vinylxylene, ethylvinylxylene, vinylnaphthalene and mixtures of these. The central block B or B' is an elastomeric polymer derived from a conjugated diene-type hydrocarbon such as 1,3-butadiene, 2,3-dimethylbutadiene, isoprene, 1,3-pentadiene or mixtures thereof. The terminal blocks A and A' have a molecular weight of preferably about 2,000 to about 100,000, and the central block B has a molecular weight of preferably about 25,000 to about 1,000,000. When the resin composition of this invention further contains the elastomer in addition to the polyphenylene ether resin and the polystyrene resin, the proportion of the polyphenylene ether is usually at least 5% based on the total weight of the resin components in the composition although it varies depending upon the purpose for which the resin composition is produced.

The resin composition of this invention may further include various additives or fillers in addition to the above resin components. Examples of the additives or fillers include stabilizers such as sterically hindered phenols, organic phosphites, phosphonites, phosphonous acids, cyclic phosphonites, hydrazine derivatives, amine derivatives, carbamate derivatives, thioethers, phosphoric triamide, benzimidazole derivatives and metal sulfides; ultraviolet absorbers such as benzotriazole derivatives, benzophenone derivatives, salicylate derivatives, sterically hindered amines, oxalic diamide derivatives and organic nickel complexes; polyolefin waxes as lubricants typified by polyethylene and polypropylene waxes; bromine-type fire retardants typified by decabromobiphenyl, decabromobiphenyl ether, pentabromotoluene, brominated bisphenol A, brominated polystyrene, a polycarbonate oligomer produced by using brominated bisphenol A, and a brominated polyphenylene ether oligomer; pigments typified by titanium dioxide, zinc oxide and carbon black; inorganic fillers typified by glass fibers, glass beads, asbestos, wollastonite, mica, talc, clay, calcium carbonate and silica; metal flakes typified by flakes of copper, nickel, aluminum and zinc; metal fibers typified by aluminum fibers, aluminum alloy fibers, brass fibers and stainless steel fibers; and organic fillers typified by carbon fibers and aromatic polyamide fibers. The amounts of these additional components vary depending upon the kinds of the substances used or the purposes for which they are added.

The polyphenylene ether resin composition of this invention may be prepared by a conventional method. For example, the individual components are mixed by a blender such as a turnable mixer or a Henschel mixer and then kneaded by an extruder, a Banbury mixer, a roll, etc.

The following examples illustrate the resin composition of this invention more specifically.

REFERENTIAL EXAMPLE 1

Production of a biphenylyl phosphate mixture A:

A reactor was charged with 340 g (2 moles) of p-phenylphenol and 307 g (2 moles) of phosphorus oxychloride, and 3 g of anhydrous aluminum chloride was added. While a nitrogen gas was passed into the reactor, the mixture was heated to 150° C. over 5 hours with stirring, and the mixture was further heated with stirring to 165° C. over 3 hours.

The reaction product was cooled, and dissolved in a nearly equal volume of carbon tetrachloride. The solution was shaken with a 3% by weight aqueous solution of sodium hydroxide three times and then with water to wash it. Carbon tetrachloride was evaporated by vacuum distillation from the solution after neutralization and purification to give a biphenylyl phosphate mixture (to be referred to as the "biphenylyl phosphate mixture A").

The composition of the biphenylyl phosphate mixture A was determined by GC-Mass analysis, and it was found to be a mixture of compounds of the formula

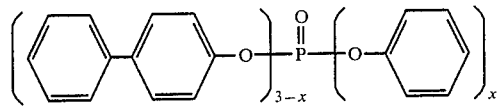

wherein the mixture is composed of 3% by weight of a compound of the above formula in which x is 0; 19% by weight of a compound of the above formula in which x is 1; 60% by weight of a compound of the above formula in which x is 2; and 19% by weight of a compound of the above formula in which x is 3.

EXAMPLE 1

Fifty parts by weight of a 2,6-dimethylphenol/2,3,6-trimethylphenol copolymer (containing 5 mole % of 2,3,6-trimethylphenol) having an intrinsic viscosity, measured at 25° C. in chloroform as a solvent, of 0.51 dl/g; 46 parts by weight of rubber-modified polystyrene containing a polystyrene matrix with an intrinsic viscosity, measured at 25° C. in chloroform as a solvent, of 0.89 dl/g and having a gel content of 16.5% by weight; 3 parts by weight of a polystyrene/polybutadiene/polystyrene-type elastomeric block copolymer (the weight ratio of styrene/butadiene=30/70, viscosity of 1500 cps as measured by a Brookfield Model RTV viscometer for a 20% toluene solution at 25° C.); 1 part by weight of an ethylene/propylene copolymer (having a reduced specific viscosity, measured at 135° C. using decalin as a solvent in a concentration of 0.1 g/100 ml, of 2.0); 19 parts by weight of the biphenylyl phosphate mixture A; 0.3 part by weight of tetrakis(2,4-di-tert-butylphenyl)-4,4'-biphenylene diphosphonite; 0.6 parts by weight of 2,2'-methylene-bis(4-methyl-6-tert-butylphenol); and 5 parts by weight of titanium oxide were mixed thoroughly by a Henschel mixer. The mixture was kneaded by a twin-screw extruder to form pellets. The pellets were molded into a test piece having a thickness of 1.5 mm, a width of 12.7 mm and a length of 127 mm by an injection molding machine. The test piece was subjected to a burning test in accordance with UL-94 standards, and the average burning time was measured. Similarly, a test piece having a thickness of about 6 mm was produced by injection molding, and its heat distortion temperature was measured. Furthermore, a dumbbell-shaped test piece having a thickness of about 3 mm was produced by injection molding, and its tensile strength was measured.

The melt flow value of the composition was measured at 230° C. under a load of 60 kg by using a "Koka-type" flow tester. The weight loss (%) of the composition on heating was measured by TGA at 300° C. by heating at a rate of 10° C./min.

The results are shown in Table 1.

REFERENTIAL EXAMPLE 2

Production of a biphenylyl phosphate mixture B:

Referential Example 1 was repeated except that o-phenylphenol was used instead of p-phenylphenol. There was obtained a biphenylyl phosphate mixture (B).

The biphenylyl phosphate mixture B was analyzed by the same method as in Referential Example 1 and found to be composed of 2% by weight of a compound of the following formula in which x is 0; 18% by weight of a compound of the following formula in which x is 1; 62% by weight of a compound of the following formula in which x is 2; and 18% by weight of a compound of the following formula in which x is 3.

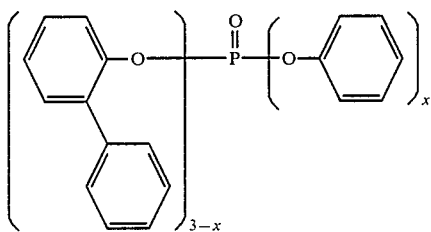

EXAMPLE 2

Test pieces were prepared by repeating Example 1 except that the biphenylyl phosphate mixture B obtained in Referential Example 2 was used instead of the biphenylyl phosphate mixture A.

The various properties of the test pieces were measured as in Example 1, and the results are shown in Table 1.

REFERENTIAL EXAMPLE 3

The biphenylyl phosphate mixture A obtained in Referential Example 1 was vacuum distilled to obtain a distillate having a boiling point of 245° to 250° C. under a reduced pressure of 0.3 mmHg. This distillate was found to be 4-biphenylyl diphenylphosphate.

EXAMPLE 3

Test pieces were prepared by repeating Example 1 except that 4-biphenylyl diphenylphosphate obtained in Referential Example 3 was used instead of the biphenylyl phosphate mixture A.

The properties of the test pieces were measured as in Example 1, and the results are shown in Table 1.

COMPARATIVE EXAMPLES 1-3

Example 1 was repeated except that triphenyl phosphate (Comparative Example 1), tricresyl phosphate (Comparative Example 2), and trixylenyl phosphate (Comparative Example 3) were used instead of the biphenylyl phosphate mixture A.

The results are shown in Table 1.

REFERENTIAL EXAMPLE 4

Production of a biphenylyl phosphate mixture C:

A reactor was charged with 376 g (4 moles) of phenol, 307 g (2 moles) of phosphorus oxychloride and 3 g of anhydrous aluminum chloride, and the reaction was carried out by the same operation as in Referential Example 1. The unreacted phosphorus oxychloride was evaporated from the reaction mixture. The residue was cooled to room temperature, and 304 g (2 moles) of p-phenylphenol was added. The reaction was completed by the same operation as in Referential Example 1.

The reaction product was neutralized and purified by the same operation as in Referential Example 1 to give a biphenylyl phosphate mixture (to be referred to as the "biphenylyl phosphate mixture C).

The composition of the biphenylyl phosphate mixture C was analyzed by the same method as in Referential Example 1, and it was found to be composed of 0% by weight of a compound of the following formula in which x is 0; 16by weight of a compound of the following formula in which x is 1; 64% by weight of a compound of the following formula in which x is 2; and 20% by weight of a compound of the following formula in which x is 3.

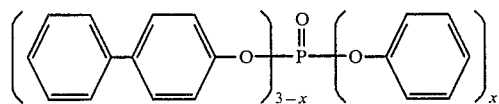

EXAMPLE 4

Forty parts by weight of the same 2,6-dimethylphenol/2,3,6-trimethylphenol copolymer as used in Example 1; 57 parts by weight of the same rubber-modified polystyrene as used in Example 1; 2 parts by weight of the same elastomeric block copolymer as used in Example 1; 1 part of the same ethylene/propylene copolymer as used in Example 1; 0.34 part by weight of tetrakis(2,4-di-tert-butylphenyl)-4,4'-biphenylene diphosphonite; 0.57 part by weight of 2,2'-methylene-bis(4-methyl-6-tert-butylpenol); 7 parts by weight of titanium oxide; and 9 parts by weight of the biphenylyl phosphate mixture C obtained in Referential Example 4 were thoroughly mixed by a Henschel mixer. The mixture was molded into test pieces as in Example 1.

The properties of the test pieces were measured as in Example 1, and the results are shown in Table 2.

TABLE 1

| Example (Ex.) or Comparative Example (CEx.) | Phosphate | Average burning time (seconds) | Weight loss upon heating (wt. %) | Heat distortion temperature (°C.) | Tensile strength (kg/cm²) | Melt flow value (cc/sec) |
|---|---|---|---|---|---|---|
| Ex. 1 | biphenylyl phosphate mixture A | 5.9 | 0.6 | 85 | 450 | $0.9 \times 10^{-1}$ |
| Ex. 2 | biphenylyl phosphate mixture B | 6.0 | 1.2 | 84 | 445 | $1.0 \times 10^{-1}$ |
| Ex. 3 | 4-biphenylyl diphenylphosphate | 6.0 | 0.3 | 87 | 450 | $1.3 \times 10^{-1}$ |
| CEx. 1 | triphenyl phosphate | 4.2 | 3.2 | 78 | 360 | $1 \times 10^{-1}$ |
| CEx. 2 | tricresyl phosphate | 5.6 | 2.6 | 76 | 340 | $1.1 \times 10^{-1}$ |
| CEx. 3 | trixylenyl phosphate | 6.1 | 2.0 | 75 | 360 | $1.2 \times 10^{-1}$ |

COMPARATIVE EXAMPLES 4-5

Example 4 was repeated except that triphenyl phosphate (Comparative Example 4) or tricresyl phosphate (Comparative Example 5) was used instead of the biphenylyl phosphate mixture C. The results are shown in Table 2.

COMPARATIVE EXAMPLE 6

Example 4 was repeated except that the biphenylyl phosphate mixture C was not used. The resultts are shown in Table 2.

a nitrogen gas. The reaction was further carried out for 5 hours at 240° C. to complete the reaction.

The reaction product was dissolved in benzene. The insoluble materials were separated by filtration. The filtrate was fully shaken with a 3% by weight aqueous solution of sodium hydroxide to wash it, and then further with water. Benzene was evaporated under reduced pressure from the solution which had been subjected to neutralization and purification.

The resulting crude crystalline compound was recrystallized from a mixture of benzene and petroleum ether to give tris(4-biphenylyl)phosphate as crystals

TABLE 2

| Example (Ex.) or Comparative Example (CEx.) | Phosphate | Average burning time (seconds) | Weight loss upon heating (wt. %) | Heat distortion temperature (°C.) | Tensile strength (kg/cm$^2$) |
|---|---|---|---|---|---|
| Ex. 4 | biphenylyl phosphate mixture C | 18.5 | 0.3 | 107 | 540 |
| CEx. 4 | triphenyl phosphate | 12.2 | 1.8 | 97 | 500 |
| CEx. 5 | tricresyl phosphate | 17.3 | 1.6 | 95 | 480 |
| CEx. 6 | None | above 30 | 0.1 | 123 | — |

REFERENTIAL EXAMPLE 5

Production of a biphenylyl phosphate mixture D:

Referential Example 1 was repeated except that 432 g (4 moles) of mixed cresols were used instead of 376 g of phenol. There was obtained a biphenylyl phosphate mixture (to be referred to as the "biphenylyl phosphate mixture D").

The composition of the biphenylyl phosphate mixture D was analyzed by the same method as in Referential Example 1, and it was found to be composed of 3% by weight of a compound of the following formula in which x is 0; 15% by weight of a compound of the following formula in which x is 1; 62% by weight of a compound of the following formula in which x is 2; and 20% by weight of a compound of the following formula in which x is 3.

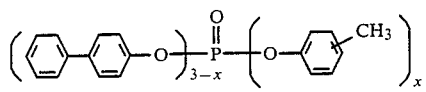

EXAMPLE 5

One hundred parts by weight of poly(2,6-dimethyl-1,4-phenylene)ether having an intrinsic viscosity, measured at 25° C. in chloroform, of 0.52 dl/g; 0.3 part by wight of tetrakis(2,4-di-tert-butylphenyl)-4,4'-biphenylenediphosphonite; 0.6 part by weight of 2,2'-methylene-bis(4-methyl-6-tert-butylphenol); and 10 parts by weight of the biphenylyl phosphate mixture D obtained in Referential Example 5 were thoroughly mixed by a Henschel mixer. The mixture was then molded into test pieces.

The properties of the test pieces were measured in the same way as in Example 1, and the results are shown in Table 3.

REFERENTIAL EXAMPLE 6

Production of tris(4-biphenylyl) phosphate:

A reactor was charged with 510 g (3 moles) of p-phenylphenol, 153 g (1 mole) of phosphorus oxychloride, and 1.5 g of anhydrous aluminum chloride, and with stirring, the mixture was heated to 150° C. over 5 hours and further to 200° C. over 8 hours while passing having a melting point of 137° C.

EXAMPLE 6

Example 5 was repeated except that the tris(4-biphenylyl)phosphate obtained in Referential Example 6 was used instead of the biphenylyl phosphae mixture D.

The results are shown in Table 3.

COMPARATIVE EXAMPLE 7

Example 5 was repeated except that triphenyl phosphate was used instead of the biphenylyl phosphate mixture D. The results are shown in Table 3.

TABLE 3

| | Phosphate | Average burning time (seconds) | Weight loss upon heating (wt. %) |
|---|---|---|---|
| Example 5 | biphenylyl phosphate mixture D | 6.4 | 0.2 |
| Example 6 | tris(4-biphenylyl) phosphate | 9.7 | 0 |
| Comparative Example 7 | triphenyl phosphate | 5.2 | 1.6 |

REFERENTIAL EXAMPLE 7

Production of a naphthyl phosphate mixture A:

A reactor was charged with 289 g (2 moles) of 2-naphthol and 307 g (2 moles) of phosphorus oxychloride, and 3 g of anhydrous aluminum chloride was added. With stirring, the mixture was heated to 150° C. over 5 hours and then to 165° C. over 3 hours, while a nitrogen gas was passed. The reaction product was cooled to room temperature, and 376 g (4 moles) of phenol was added. The mixture was stirred while the temperature was gradually elevated. While passing a nitrogen gas, the mixture was heated to 190° C. over 6 hours and then to 200° C. over 3 hours to complete the reaction.

The reaction product was cooled, and dissolved in a nearly equal volume of carbon tetrachloride. The resulting solution was shaken three times with a 3% by weight of aqueous solution of sodium chloride, and then with water to wash it. Carbon tetrachloride was evaporated by vacuum distillation from the solution which had thus been subjected to neutralization and purification. Then, about 70 g of a distillate having a boiling point of 175° to 180° C. under a reduced pressure of 5 mmHg was evaporated to give a naphthyl phosphate mixture (to be referred to as the "naphthyl phosphate mixture A").

The composition of the resulting naphthyl phosphate mixture A was determined by GC-MASS analysis. It was found to be composed of 2% by weight of a compound of the following formula in which x is 0; 27% by weight of a compound of the following formula in which x is 1; 64% by weight of a compound of the following formula in which x is 2; and 7% by weight of a compound of the following formula in which x is 3.

$$\left(\underset{3-x}{\bigcirc\bigcirc}-O\right)\overset{O}{\underset{\|}{P}}\left(-O-\bigcirc\right)_x$$

EXAMPLE 7

Test pieces were prepared in the same way as in Example 1 except that the naphthyl phosphate mixture A obtained in Referential Example 7 was used instead of the biphenylyl phosphate mixture. The properties of the test pieces were measured as in Example 1, and the results are shown in Table 4.

REFERENTIAL EXAMPLE 8

Production of a naphthyl phosphate mixture B:

Referential Example 7 was repeated except that 1-naphthol was used instead of 2-naphthol. There was obtained a naphthyl phosphate mixture (to be referred to as the "naphthyl phosphate mixture B").

The composition of the naphthyl phosphate mixture B was analysed by the same method as in Referential Example 7, and it was found to be composed of 1% by weight of a compound of the following formula in which x is 0; 28% by weight of a compound of the following formula in which x is 1; 65% by weight of a compound of the following formula in which x is 2; and 6% by weight of a compound of the following formula in which x is 3.

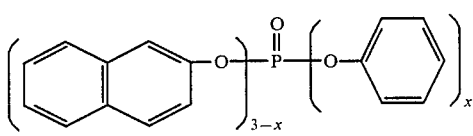

EXAMPLE 8

Test pieces were prepared in the same way as in Example 7 except that the naphthyl phosphate mixture B obtained in Referential Example 8 was used instead of the naphthyl phosphate mixture A. The properties of the test pieces were measured as in Example 7, and the results are shown in Table 4.

REFERENTIAL EXAMPLE 9

The naphthyl phosphate mixture A obtained in Referential Example 7 was distilled under vacuum, and a distillate having a boiling point of 310° to 320° C. under a reduced pressure of 0.4 mmHg was separated. This distillate was 2-naphthyl diphenylphosphate

EXAMPLE 9

Test pieces were obtained in the same way as in Example 7 except that 2-naphthyl diphenyl phosphate obtained in Referential Example 9 was used instead of the naphthyl phosphate mixture A.

The properties of the test pieces were measured in the same way as in Example 7, and the results are shown in Table 4. For easy comparison, Table 4 also gives the results obtained in Comparative Examples 1, 2 and 3.

TABLE 4

| Example (Ex.) or Comparative Example (CEx.) | Phosphate | Average burning time (seconds) | Weight loss upon heating (wt. %) | Heat distortion temperature (°C.) | Tensile strength (kg/cm$^2$) | Melt flow value (cc/sec) |
| --- | --- | --- | --- | --- | --- | --- |
| Ex. 7 | naphthyl phosphate mixture A | 5.6 | 0.8 | 85 | 446 | $1.1 \times 10^{-1}$ |
| Ex. 8 | naphthyl phosphate mixture B | 5.8 | 0.8 | 86 | 445 | $1.2 \times 10^{-1}$ |
| Ex. 9 | 2-naphthyl diphenylphosphate | 6.1 | 0.5 | 87 | 450 | $1.0 \times 10^{-1}$ |
| CEx. 1 | triphenyl phosphate | 4.2 | 3.2 | 78 | 360 | $1.0 \times 10^{-1}$ |
| CEx. 2 | tricresyl phosphate | 5.6 | 2.6 | 76 | 340 | $1.1 \times 10^{-1}$ |
| CEx. 3 | trixylenyl phosphate | 6.1 | 2.0 | 75 | 360 | $1.2 \times 10^{-1}$ |

REFERENTIAL EXAMPLE 10

Production of a naphthyl phosphate mixture C:

A reactor was charged with 376 g (4 moles) of phenol, 307 g (2 moles) of phosphorus oxychloride and 3 g of anhydrous aluminum chloride, and the reaction was carried out by the same operation as in Referential Example 7. The unreacted phosphorus oxychloride was evaporated from the reaction mixture, and the residue was cooled to room temperature. Then, 340 g (2 moles) of 2-naphthol as added, and the reaction was completed by the same operation as in Referential Example 7.

The resulting reaction product was neutralized and purified by the same operation as in Referential Example 7. Carbon tetrachloride was evaporated from the reaction mixture by distillation under reduced pressure to give a naphthyl phosphate mixture (to be referred to as the "naphthyl phosphate mixture C").

The composition of the naphthyl phosphate mixture C was analyzed by the same method as in Referential Example 7, and it was found to be composed of 0% by wight of a compound of the following formula in which x is 0; 21% by weight of a compound of the following formula in which x is 1; 56% by weight of a compound of the following formula in which x is 2; and 23% by weight of a compound of the following formula in which x is 3.

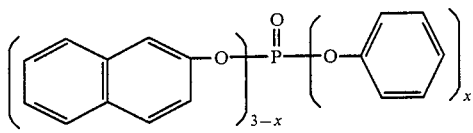

EXAMPLE 10

Example 4 was repeated except that the naphthyl phosphate mixture C obtained in Referential Example 10 was used instead of the biphenylyl phosphate mixture C. The results are shown in Table 5. For easy comparison, Table 5 also gives the results obtained in Comparative Examples 4, 5 and 6.

TABLE 5

| Example (Ex.) or Comparative Example (CEx.) | Phosphate | Average burning time (seconds) | Weight loss upon heating (wt. %) | Heat distortion temperature (°C.) | Tensile strength (kg/cm$^2$) |
|---|---|---|---|---|---|
| Ex. 10 | naphthyl phosphate mixture C | 16.3 | 0.4 | 105 | 530 |
| CEx. 4 | triphenyl phosphate | 12.2 | 1.8 | 97 | 500 |
| CEx. 5 | tricresyl phosphate | 17.3 | 1.6 | 95 | 480 |
| CEx. 6 | None | above 30 | 0.1 | 123 | — |

REFERENTIAL EXAMPLE 11

Production of a naphthyl phosphate mixture D:

Referential Example 7 was repeated except that 432 g (4 moles) of mixed cresols were used instead of 376 g of phenol. There was obtained a naphthyl phosphate mixture (to be referred to as the "naphthyl phosphate mixture D").

The composition of the naphthyl phosphate mixture D was analyzed by the same method as in Referential Example 7, and it was found to be composed of 2% by weight of a compound of the following formula in which x is 0; 25% by weight of a compound of the following formula in which x is 1; 67% by weight of a compound of the following formula in which x is 2; and 6% by weight of a compound of the following formula in which x is 3.

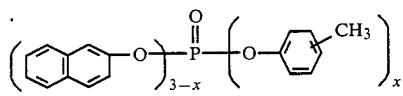

EXAMPLE 11

Example 5 was repeated except that the naphthyl phosphate mixture D obtained in Referential Example 11 was used instead of the biphenylyl phosphate mixture D. The results are shown in Table 6.

REFERENTIAL EXAMPLE 12

Production of tris(2-naphthyl)phosphate:

A reactor was charged with 434 g (3 moles) of 2-naphthol, 153 g (1 mole) of phosphorus oxychloride and 1.5 g of anhydrous aluminum chloride. With stirring, the mixture was heated to 150° C. over 5 hours, and then to 200° C. over 8 hours, while passing nitrogen gas. Finally, the reaction mixture was heated at 240° C. for 5 hours to complete the reaction.

The reaction product was dissolved in benzene, and the insoluble materials were separated by filtration. The filtrate was fully shaken with a 3% by weight aqueous solution of sodium hydroxide and then with water to wash it. Benzene was evaporated under reduced pressure from the solution which had been subjected to neutralization and purification.

The resulting crude cyrstalline product was recrystallized from a mixture of benzene and petroleum ether to give tris(2-naphthyl) phosphate as crystals having a melting point of 110° to 111° C.

EXAMPLE 12

Example 11 was repeated except that the tris(2-naphthyl) phosphate obtained in Referential Example 12 was used instead of the naphthyl phosphate mixture D.

The results are shown in Table 6. For comparison, Table 6 also gives the results of Comparative Example 7.

TABLE 6

| | Phosphate | Average burning time (seconds) | Weight loss upon heating (wt. %) |
|---|---|---|---|
| Example 11 | naphthyl phosphate mixture D | 6.1 | 0.3 |
| Example 12 | tris(2-naphthyl) phosphate | 8.6 | 0.1 |
| Comparative Example 7 | triphenyl phosphate | 5.2 | 1.6 |

As is seen from the foregoing Examples and Comparative Examples, the phosphate compounds specified in this invention impart an effective fire retarding effect to polyphenylene ether resins without degrading their heat resistance, mechanical strength and moldability. It is particularly noteworthy that weight loss of the phosphate compounds of this invention upon heating is much lower than that of known phosphate compounds typified by triphenyl phosphate. This means that the phosphate compounds used in this invention do not volatilize from the polyphenylene ether resin composition even at high temperatures. This is a very useful phenomenon in practical applications.

What is claimed is:

1. A polyphenylene ether resin composition having excellent first retardancy comprising
   (A) a polyphenylene ether resin, and (B) at least one phosphate compound selected from the group consisting of biphenylyl phosphate compounds represented by the following formula

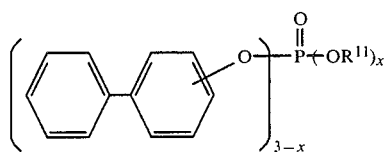
(B1)

wherein x is 1 or 2, and $R^{11}$ represents a linear or branched alkyl group having 1 to 8 carbon atoms or a phenyl group, provided that the biphenyl group and phenyl group may each be substituted by an alkyl group having 1 to 3 carbon atoms, and naphthyl phosphate compounds represented by the following formula

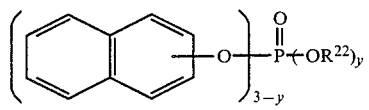
(B2)

wherein y is 1 or 2, and $R^{22}$ represents a linear or branched alkyl group having 1 to 8 carbon atoms or a phenyl group, provided that the naphthyl group and phenyl group may each be substituted by an alkyl group having 1 to 3 carbon atoms.

2. The polyphenylene ether resin composition of claim 1 which further contains a polystyrene resin.

3. The polyphenylene ether resin composition of claim 1 wherein the polyphenylene ether resin is a homopolymer or a copolymer of a monocyclic phenol represented by the following formula

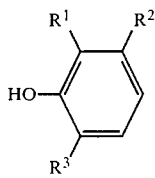
(I)

wherein $R^1$ represents an alkyl group having 1 to 3 carbon atoms, and $R^2$ and $R^3$, independently from each other, represent a hydrogen atom or an alkyl group having 1 to 3 carbon atoms.

4. The polyphenylene ether resin composition of claim 2 wherein the polystyrene resin is a resin containing at least 25% by weight of recurring structural units represented by the following general formula

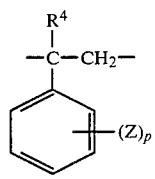
(III)

wherein $R^4$ represents a hydrogen atom or a lower alkyl group, Z represents a halogen atom or a lower alkyl group, and p is zero or an integer of 1 to 3.

5. The polyphenylene ether resin composition of claim 1 where in the amount of the phosphate compound is 1 to 50% by weight.

6. The polyphenylene ether resin composition of claim 2 wherein the amount of the phosphate compound is 1 to 50% by weight.

* * * * *